United States Patent [19]
Wurm

[11] 3,983,797
[45] Oct. 5, 1976

[54] FILTERING DEVICE FOR THE PREPARATION OF COFFEE

[75] Inventor: Alfred Wurm, Munich, Germany

[73] Assignee: Interelectric Aktiengesellschaft, Sachseln, Switzerland

[22] Filed: May 27, 1975

[21] Appl. No.: 580,617

[52] U.S. Cl. ................................. 99/306; 99/301
[51] Int. Cl.² ........................................ A47J 31/14
[58] Field of Search ............ 99/306, 300, 304, 305, 99/309, 311, 316, 321

[56] References Cited
UNITED STATES PATENTS

| | | | |
|---|---|---|---|
| 960,419 | 6/1910 | Selg | 99/306 X |
| 1,188,341 | 6/1916 | Thomas | 99/300 |
| 2,052,476 | 8/1936 | Koch | 99/306 X |
| 2,358,556 | 9/1944 | Block | 99/321 |
| 2,365,269 | 12/1944 | Hill | 99/304 X |

*Primary Examiner*—Peter Feldman
*Assistant Examiner*—Arthur O. Henderson
*Attorney, Agent, or Firm*—Frederick E. Bartholy

[57] ABSTRACT

A filtering device for the preparation of coffee comprises a vessel with a permanent metallic filter disk forming the bottom thereof. Vertically extending walls divide the vessel into distinct compartments of varying volumetric content, thus separating distinct areas of the filter disk. A water inlet is provided for one of the compartments in which the coffee powder is placed so that the amount of water used at any one time determines the active area of the filter disk utilized by virtue of the overflow between compartments.

5 Claims, 3 Drawing Figures

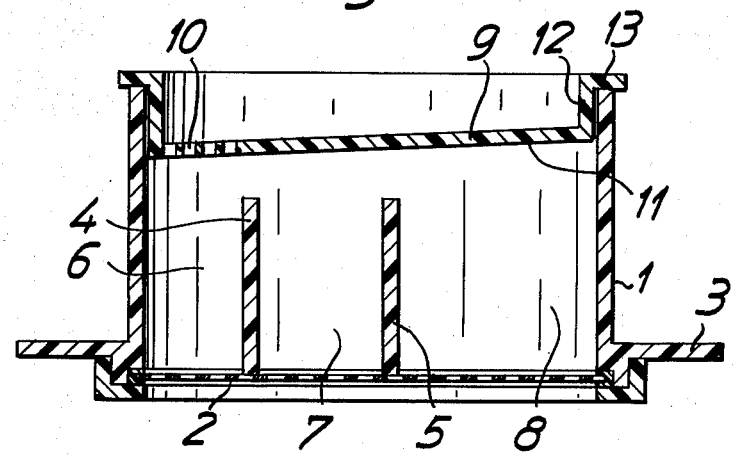
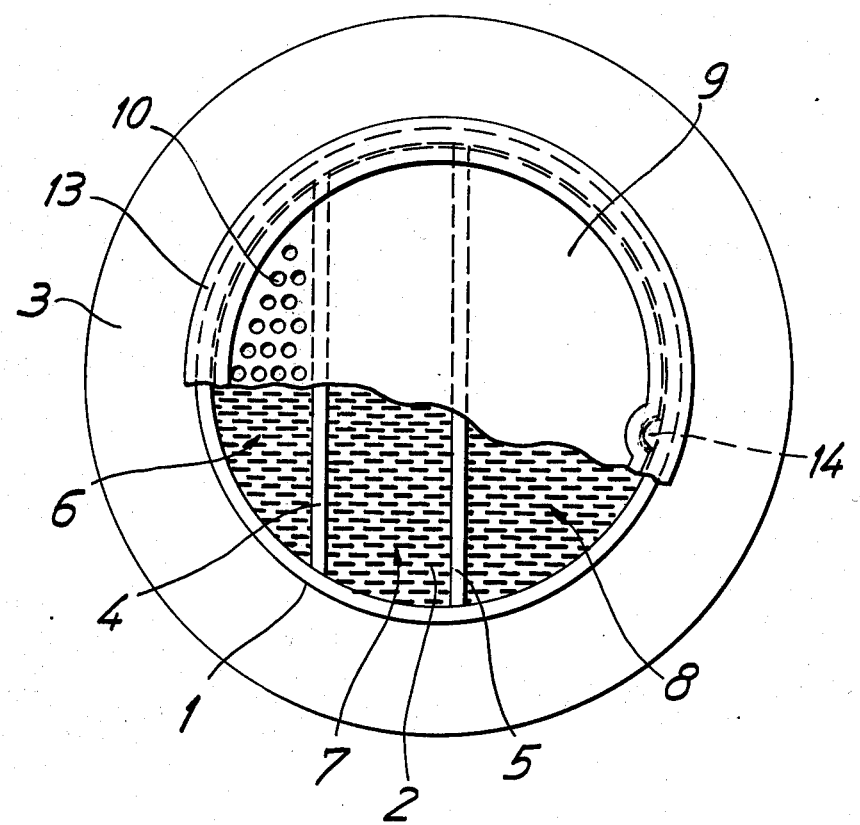

FILTERING DEVICE FOR THE PREPARATION OF COFFEE

The invention pertains to coffee filtering devices and, more particularly, for a container utilizing a permanent filter.

Filtering devices for preparing coffee by means of a container adapted to receive boiling water, a receptacle for powdered coffee therewithin and a filter through which the liquid passes, have been used in various forms. These have the disadvantage that optimum efficiency can only be obtained within a narrow range of a given quantity of powdered coffee and volume of water to be used for the purpose.

Should the coffee powder quantity vary, or the volume of water be changed with respect to prescribed amount then, from a practical standpoint, the results were unsatisfactory. The reason is that the time of flow-through versus powder quantity becomes too long. For example, if such filters are used with only one-half the prescribed quantity of coffee, the water flow-through is too fast, resulting in insufficient saturation for optimum efficiency.

It is the primary object of the invention to provide a filter arrangement which permits optimum utilization of the coffee powder within a wider range of fluid quantities.

It is a particular feature of the invention that the filter is divided by means of compartments within the container and become effective in accordance with the water level within each compartment and the overflow from one to the other.

It is a particular advantage of the embodiment constructed in accordance with the invention that a water inlet is provided over only one particular compartment and reaches other compartments progressively when the quantity of water exceeds the volume of each compartment.

Other objects features and advantages will be apparent from the following description of the invention, pointed out in particularity in the appended claims, and taken in connection with the accompanying drawings in which:

FIG. 1 is a sectional view of a container and filter combination;

FIG. 2 is a top view of the container partially cut away for clearer illustration.

Figure 3:
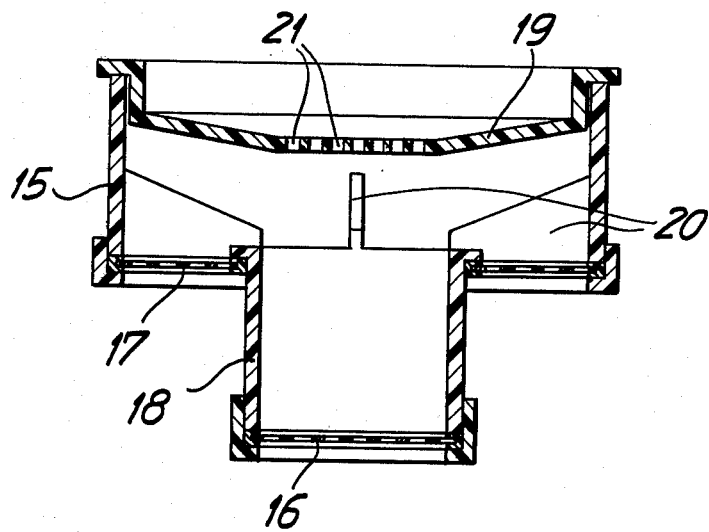
FIG. 3 is a sectional view of a modified form of container and filter assembly.

Referring to FIGS. 1 and 2, the filter arrangement comprises a pot-shaped, cylindrical hot water vessel 1, the bottom of which is closed by metallized filter disk 2. Attached to the vessel 1, above the bottom edge thereof, is a ring-shaped disk 3 which serves as a support means for the vessel 1 when placed over a coffee pot or cup.

Within the vessel 1 are two vertically-extending separating walls 4 and 5, respectively. These are solidly attached to the inner wall of the vessel 1 and touch the filter disk 2 in a fluid-tight manner. By this construction, the container is actually divided into three fluid compartments, namely, 6, 7 and 8. The separating walls 4 and 5 are below the height of the vessel 1.

Over the top of vessel 1 is placed a horizontally-extending divider plate 9 which has a series of perforations 10 located directly above the compartment 6. The plate 9 is in the shape of a tray having a slanting bottom wall 11 and a side wall 12. The latter has a flange 13 resting on the edge of the vessel 1. The arrangement is such that the tray can only be placed in one position, namely, so that the perforations 10 will be directly above the compartment 6 toward which the bottom 11 slants. This may be effected in various ways, for example, by an inwardly-extending protuberance 14 which fits in a notch in the side wall of the vessel 1.

The function of the filter arrangement is as follows. A desired amount of powdered coffee is placed in the compartment 6. The tray 9 is then placed over the vessel 1. As hot water is poured into the vessel, it flows over the slanting bottom 11 of the tray 9 and through the perforations 10 into the coffee in the compartment 6. It is assumed that the latter has such volume as to hold a sufficient amount of coffee for one cup. If only one cup of coffee is desired, then only such volume of water is poured in as will not overflow into the adjacent compartment 7. In this manner only the area of the filter disk 2 which extends over the bottom of compartment 6 is used.

Now it is to be understood that the compartments 7 and 8 are so proportioned that compartment 7 has a two-cup volume whereas compartment 8 has a three-cup volume.

If, for example, three cups of coffee need be brewed, then compartment 6 is filled with the amount of coffee needed for that many cups. Since the amount of water now used is more than the volumetric content of compartment 6, once the latter is filled, water will spill over the dividing wall 5 into the adjacent compartment 7, taking with it coffee particles until the compartment is quickly filled. It is seen from the above example that the filter area utilized is three times greater than when only one cup of coffee was brewed.

If it is desired to brew three to six cups of coffee, the compartment 6 is filled with the required amount of coffee. When hot water is poured into the distribution tray 9, not only will the compartment 6 and 7 be filled, but overflow of water will also more or less fill compartment 8.

It is seen that in this case a six times greater filter area will be used in comparison to that for one cup of coffee. It is clear that, in this manner, the utilized filter area adjusts itself to the amount of water poured in. This type of filter construction permits optimum utilization of the coffee in a wide range of water quantities.

The above-described brewing efficiency is the crux of the invention and resides in the basic construction of isolated compartments of varying volume in which only one of the compartments contains the required amount of coffee and that this compartment lies beneath the water input. The flow of the water is so proportioned by the geometry of the vessel, and the perforations through which it must pass, that it stirs up the coffee powder into intimate contact as it carries some of it into the overflow.

The modification shown in FIG. 3 utilizes the same principle. The filter is in two separate portions, namely, a filter disk 16 and a filter ring 17. The two filters are separated by a downwardly-extending cylindrical portion 18. In this manner the filters 16 and 17 are at different levels. The outer rim of the filter ring 17 is attached to the wall of the vessel 15 which supports the water-regulating tray 19. The function of the latter is similar to that described in connection with FIGS. 1 and 2 except that the perforations 21 are in the center opposite the filter holder 18. The latter and the vessel 15 are held by radially-extending, reinforcing ribs 20.

The basic operation of the filter assembly shown in FIG. 3 is the same as described in connection with FIGS. 1 and 2. When the volume of water poured in is less than the capacity of the portion 18 there will be no overflow into vessel 15 and only the filter disk 16 is utilized. However, when a greater volume of water is used, then an overflow occurs into the vessel 15 so that the filter ring 17 takes part in the filtering action. Consequently, the active filter area is enlarged.

The invention in its broader aspects is not limited to the specific embodiments herein shown and described but changes may be made within the scope of the accompanying claims without departing from the principles of the invention and without sacrificing its chief advantages.

What is claimed is:

1. A filtering device for the preparation of coffee comprising a vessel, a permanent filter disk attached to the bottom of said vessel, a plurality of dividing walls within said vessel forming compartments over said filter disk, a water distribution tray within said vessel and extending over said compartments, said tray having a water outlet portion in alignment with only one of said compartments, the amount of water used at any one time determining the overflow between said compartments and thereby the active area of said filter disk utilized.

2. A filtering device in accordance with claim 1, wherein said compartments have progressively greater volumetric contents.

3. A filtering device in accordance with claim 1, wherein the water outlet portion of said distribution tray is located over the compartment having the smallest volumetric content.

4. A filtering device in accordance with claim 1, wherein said vessel is provided with an outer ring adapted to place said vessel over a container.

5. A filtering device in accordance with claim 1, wherein said water distribution tray has a locating protuberance for engagement in a notch, thereby assuring the proper placement thereof for the alignment of the perforations above said smallest compartment.

* * * * *